US011752746B2

(12) United States Patent
Ambroise et al.

(10) Patent No.: US 11,752,746 B2
(45) Date of Patent: Sep. 12, 2023

(54) BI-ORIENTED, LINEAR, LOW-DENSITY POLYETHYLENE FILM WITH IMPROVED SEALING PROPERTIES

(71) Applicant: Jindal Films Americas LLC, LaGrange, GA (US)

(72) Inventors: Benoît Ambroise, Nobressart (BE); Michael D. Cleckner, Rochester, NY (US); Christophe E. Guillaume, Namur (BE); Lesley A. Bliss, Newnan, GA (US)

(73) Assignee: Jindal Films Americas LLC, LaGrange, GA (US)

( * ) Notice: Subject to any disclaimer, the term of this patent is extended or adjusted under 35 U.S.C. 154(b) by 395 days.

(21) Appl. No.: 16/111,365

(22) Filed: Aug. 24, 2018

(65) Prior Publication Data

US 2018/0361722 A1    Dec. 20, 2018

Related U.S. Application Data

(63) Continuation of application No. PCT/US2017/172818, filed on Apr. 18, 2017.
(Continued)

(51) Int. Cl.
*B32B 27/32* (2006.01)
*B32B 27/30* (2006.01)
(Continued)

(52) U.S. Cl.
CPC .............. *B32B 27/32* (2013.01); *B32B 27/16* (2013.01); *B32B 27/20* (2013.01); *B32B 27/306* (2013.01);
(Continued)

(58) Field of Classification Search
CPC ..... B32B 27/32; B32B 27/306; B32B 27/308; B32B 27/20; B32B 27/16;
(Continued)

(56) References Cited

U.S. PATENT DOCUMENTS

| 2003/0008153 A1 | 1/2003 | Migliorini et al. |
| 2005/0037219 A1 | 2/2005 | Ohlsson et al. |

(Continued)

FOREIGN PATENT DOCUMENTS

JP      2010264642 A    11/2010

OTHER PUBLICATIONS

Machine Translation of JP 2010/264642 A. (Year: 2010).*
(Continued)

*Primary Examiner* — Brian Handville
(74) *Attorney, Agent, or Firm* — KEARNEY, MCWILLIAMS & DAVIS; Erik J. Osterrieder (57) ABSTRACT

Disclosed are compositions, methods, and uses for multilayered films which are intended to provide high quality sealants having sufficient sealing strength for use in packaging and other applications while being more cost-effective and higher-yield than traditional combinations of unoriented polyolefin films and web materials. The film comprises a multilayer structure of LLDPE having a core layer, a surface skin layer, and a sealant skin layer. The core layer further comprises a slip agent, while the skin layers further comprise antiblock agents. Optional embodiments may include tie layers between the core layer and the skin layers, or may include pigments in one or more of the core layer or tie layers. The surface skin layer may be subjected to a surface treatment (e.g., corona treatment) to improve suitability for coating or metallization.

19 Claims, 1 Drawing Sheet

Related U.S. Application Data (60) Provisional application No. 62/324,069, filed on Apr. 18, 2016.

(51) Int. Cl.
  *B32B 27/20* (2006.01)
  *B32B 27/16* (2006.01)
  *C08L 23/06* (2006.01)
  *C08K 5/00* (2006.01)
  *C09J 123/08* (2006.01)

(52) U.S. Cl.
  CPC ............ *B32B 27/308* (2013.01); *C08K 5/005* (2013.01); *C08L 23/06* (2013.01); *C09J 123/0815* (2013.01); *B32B 2255/10* (2013.01); *B32B 2255/26* (2013.01); *B32B 2307/518* (2013.01); *B32B 2323/046* (2013.01); *B32B 2439/06* (2013.01); *C08L 2203/16* (2013.01); *C08L 2207/066* (2013.01)

(58) Field of Classification Search
  CPC ........ B32B 2323/046; B32B 2307/518; B32B 2439/06; B32B 2255/10; B32B 2255/26; C09J 123/0815; C08L 23/06; C08L 2207/066; C08L 2203/16; C08K 5/005
  See application file for complete search history.

(56) References Cited

U.S. PATENT DOCUMENTS

| | | | |
|---|---|---|---|
| 2009/0286024 A1 | 11/2009 | Lu | |
| 2010/0273377 A1 | 10/2010 | Files et al. | |
| 2012/0202942 A1* | 8/2012 | Mavridis | ............ C08L 23/0815 524/528 |
| 2015/0148492 A1 | 5/2015 | Pirtle | |

OTHER PUBLICATIONS

Shane Thomas, International Search Report and Written Opinion on PCT/US17/28181, dated Jul. 27, 2017, USPTO, Alexandria, VA.

Erik J. Osterrieder, Article 34 Amendments and Response to International Search Report and Written Opinion on PCT/US17/28181, dated Sep. 6, 2017, Houston, TX.

Prashant J. Khatri, IPER on PCT/US17/28181, Dec. 11, 2017, USPTO, Alexandria, VA.

* cited by examiner

BI-ORIENTED, LINEAR, LOW-DENSITY POLYETHYLENE FILM WITH IMPROVED SEALING PROPERTIES

REFERENCE TO RELATED APPLICATION

This is a continuation application, which claims priority to PCT application PCT/US17/28181 filed Apr. 18, 2017, which claims priority to U.S. provisional application 62/324,069 filed Apr. 18, 2016, which are incorporated by this reference in their entireties.

FIELD

This disclosure relates to hi-oriented, linear, low-density films having good sealing properties.

BACKGROUND

Cast or blown unoriented polyethylene ("PE") or polypropylene ("PP") films are broadly used as sealants in packaging or other applications.

Such films generally have mediocre physical properties, and, consequently, are combined with other web materials, such as paper, polyethylene terephthalate ("PET"), biaxially oriented ("BO") polypropylene ("PP"), polyamides such as nylon, aluminum foil, or other material in order to provide, for example, enhanced barrier protection, rigidity, and print quality.

However, the need to combine these films with the web materials increases the thickness of these films, which also reduces the yield from a given quantity of polymer (and therefore increased manufacturing cost.)

This disclosure provides for new multilayer films and methods that combine low film thickness with enhanced sealing properties, e.g., high seal strengths, high quality hermetic seals, and significant seal-through-contamination in the sealing area of a package, bag, or other container which contains, for example, fluids, oils, powders or fibers which may otherwise interfere with seal formation. Moreover, these new multilayer films translate into a reduced amount of packaging and costs of materials, while providing the same or improved performances.

SUMMARY

In various embodiments, disclosed are multilayer films, typically a polymeric film having improved sealing properties, comprising a core layer, optionally one or more tie layers intermediate on one or both sides of the core, a sealant layer on at least one side of the core (or tie layer(s) if present), and, in some embodiments comprising sealant layers on both sides of the core (optionally with tie layer(s) therebetween). One layer may be treated and metallized, and optionally have polymer coating(s), whether with or without primer(s), and/or skin layer(s).

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away from the contents of any packaging, and "below," "lower," "downward," "bottom," and similar terms refer to a direction toward the contents of any packaging, but these are meant for illustrative purposes only, and the terms are not meant to limit the disclosure.

Specific embodiments, versions and examples are now be described, including exemplary embodiments and definitions that are adopted herein for purposes of understanding. While the following detailed description gives specific preferred embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

As used herein, "plastomer" is defined as a propylene-based or ethylene-based copolymer having a density in the range of 0.850 g/cm³ to 0.920 g/cm³ and a DSC melting point of at least 40° C.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

It has been discovered that certain embodiments of coextruded, biaxially oriented, linear low-density polyethylene (LLDPE) films, as exemplified below, can provide enhanced sealing at a reduced thickness. Such films may be produced, for example, on a bi-orientation line, such as that described in U.S. Pat. No. 8,080,294, which is incorporate herein by this reference. In the following examples, listed in Tables 1-4, it is noted the films' thicknesses are 30 µm, but other embodiments may have variations in thicknesses, and may fall in the range from 10 µm to 120 µm, for example.

TABLE 1

| Reference Example | | |
|---|---|---|
| Corona-treated surface | | |
| skin layer | 1.0 µm | LLDPE + antiblock (e.g., 1000 ppm of a 5 µm zeolite) |

TABLE 1-continued

Reference Example

Corona-treated surface

| | | |
|---|---|---|
| core layer | 28 μm | LLDPE + slip agent (e.g., 1000 ppm Erucamide or other migratory slip agent) |
| sealant skin layer | 1.0 μm | LLDPE + antiblock (e.g., 7500 ppm of a 6 μm silicate) |

TABLE 2

Sample 1

Corona-treated surface

| | | |
|---|---|---|
| skin layer | 1 μm | LLDPE + antiblock (e.g., 1000 ppm of a 5 μm zeolite) |
| tie layer | 5 μm | LLDPE |
| core layer | 18 μm | LLDPE + slip agent (e.g., 2000 ppm Erucamide or other migratory slip agent) |
| tie layer | 5 μm | LLDPE (e.g., SP0540) + slip agent (e.g., 2000 ppm Erucamide or other migratory slip agent) |
| sealant skin layer | 1 μm | LLDPE (e.g., SP0540) + antiblock (e.g., 10,000 ppm of a 6 μm silicate) |

TABLE 3

Sample 2

Corona-treated surface

| | | |
|---|---|---|
| skin layer | 1 μm | LLDPE + antiblock (e.g., 1000 ppm of a 5 μm zeolite) |
| tie layer | 5 μm | LLDPE |
| core layer | 18 μm | LLDPE + slip agent (e.g., 2000 ppm Erucamide or other migratory slip agent) |
| tie layer | 5 μm | LLDPE (e.g., Exact 3132) + slip agent (e.g., 2000 ppm Erucamide or other migratory slip agent) |
| sealant skin layer | 1 μm | LLDPE (e.g., Exact 3132) + antiblock (e.g.. 10,000 ppm of a 6 μm silicate) |

TABLE 4

Sample 3

Corona-treated surface

| | | |
|---|---|---|
| skin layer | 1 μm | LLDPE + antiblock (e.g., 1000 ppm of a 5 μm zeolite) |
| pigmented tie layer | 5 μm | LLDPE + pigment (e.g., 15% Ampacet $TiO_2$ masterbatch) |
| pigmented core layer | 18 μm | LLDPE + slip agent (e.g., 2000 ppm Erucamide or other migratory slip agent) + pigment (e.g., 15% Ampacet $TiO_2$ masterbatch) |
| sealant tie layer | 5 μm | LLDPE (e.g., SP0540) + slip agent (e.g., 2000 ppm Erucamide or other migratory slip agent) + optional pigment (e.g., 15% Ampacet $TiO_2$ masterbatch) |
| sealant skin layer | 1 μm | LLDPE (e.g., SP0540) + antiblock (e.g., 10,000 ppm of a 6 μm silicate) |

TABLE 5

Sample 4

Corona-treated surface

| | | |
|---|---|---|
| skin layer | 1 μm | LLDPE + antiblock (e.g., 1000 ppm of a 5 μm zeolite) |
| pigmented tie layer | 5 μm | LLDPE |
| pigmented core layer | 18 μm | LLDPE |
| sealant tie layer | 5 μm | LLDPE (e.g., SP0540) |
| sealant skin layer | 1 μm | LLDPE (e.g., SP0540) + antiblock (e.g., 2000 ppm of a 5 μm zeolite) + non-migratory slip agent (e.g., 4% Dow Corning 50-313 50% Si gum master-batch) |

In the foregoing examples, the LLDPE resins among the various coextruded layers may be the same or different in terms of physical properties, e.g., melt indices, density, melting peaks, and so forth. In an embodiment, the LLDPE of the sealant-side skin layer and tie layer may have a higher melt index and a lower density than the LLDPE of the core layer and/or the outward-facing skin and tie layers, in order to enhance the heat-sealing properties of the sealant-side layers and to avoid visual distortions and rheological defects caused by the sealing. For similar reasons, the sealant skin layer comprises a greater concentration of anti-block agents such as zeolite and/or silicate (other anti-block agents may be used, as will be discussed later).

In the core layer, one or more metallocene-catalyzed LLDPEs are used, generally because m-LLDPEs improve bi-orientation processability. However, in sealant, tie, or skin layers, m-LLDPEs, Ziegler-Natta (ZN-LLDPEs), or other LLDPEs may be used. Later paragraphs provide details on acceptable ranges for physical properties and other salient features.

With regard to examples, to ensure that variations did not occur based on suppliers of ostensibly the same or at least similar LLDPE resins, Samples 1 and 2 were run. Here, the lower tie and skin layers of sample 1 differed from the lower tie and skin layers of sample 2; otherwise, these sample films are the same. Comparative sealability, barrier efficiency, and appearance differences did not occur between these two sample films.

The pigmented layers of Sample 3 utilized 15% Ampacet $TiO_2$ master-batch, wherein the master-batch is Ampacet 10359C, which was 70% $TiO_2$ in a LDPE carrier. Although $TiO_2$ is a pigment, in other embodiments, non-white pigment(s) may be used instead or in combination with white pigment(s). And, instead of in addition to pigmentation, a cavitating agent, such as $CaCO_3$, may impart desired white-opaque properties desired by a customer and still deliver thin films providing decreased density and remarkable seal strength.

Most of the foregoing foregoing examples show migratory slip agent(s) in one or more layers. Alternatively to migratory slip agents, non-migratory slip agents may be used, as in Sample 4. When doing so, non-migratory slip agents are placed in one or more sealant layers instead of the core layer, generally. Further discussion of slip agents is provided later in this disclosure.

Figure 1:
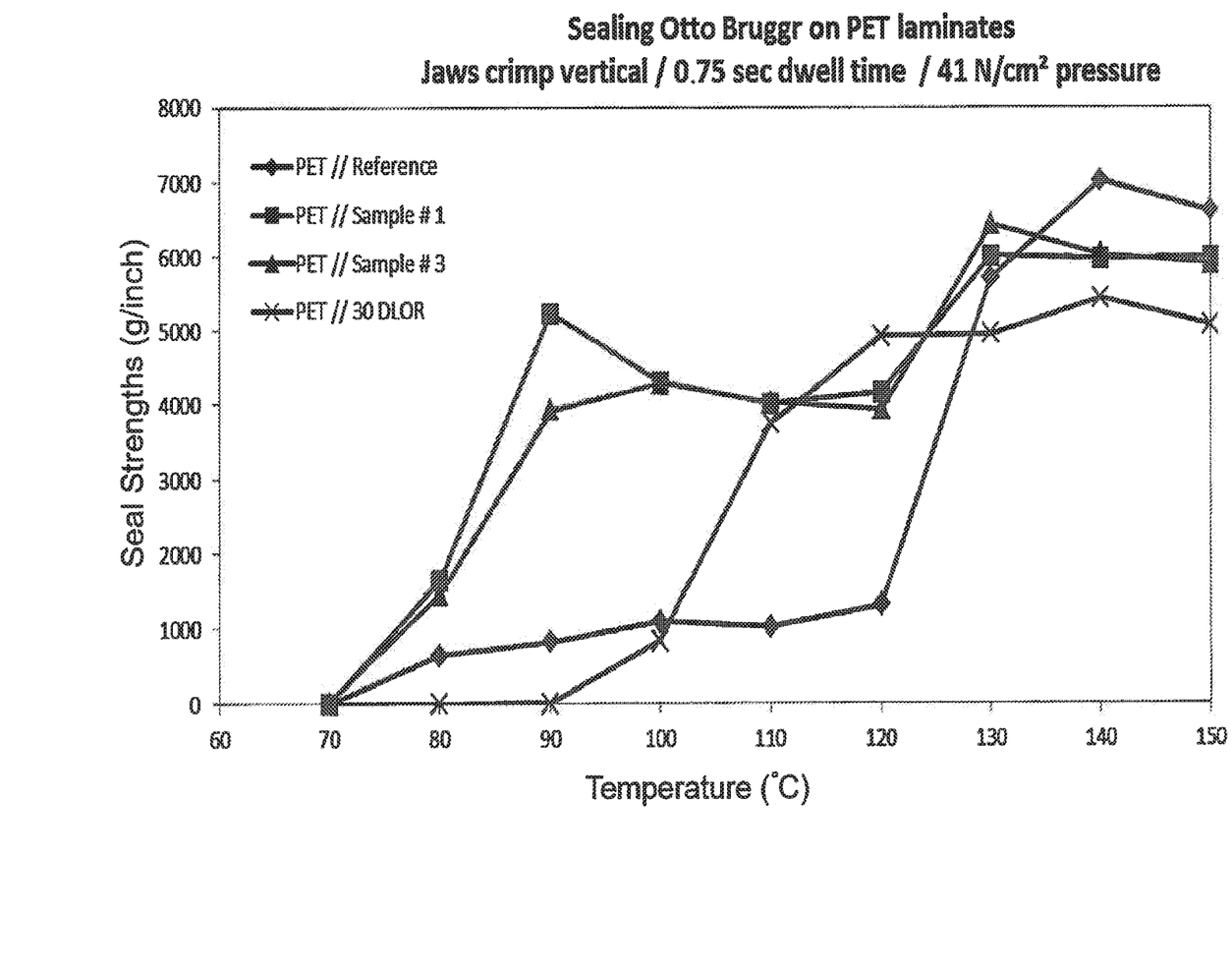
FIG. 1 depicts sealing strength test results for several of the disclosed embodiments in comparison with a standard benchmark film (30DLOR).

Turning now to FIG. 1, a test was performed in which the disclosed film samples were adhered to polyester ("PET") substrates using a solvent-based adhesive, e.g., Henkel's Liofol® or Dow's Adcote™ 575S, and heat-sealed using an Otto Bruger sealer having crimp jaws set to exert a pressure 41 N/cm² for a dwell time of 0.75 sec. (Naturally, variations in pressure and dwell time may differ for charting seal strengths.) Under these conditions, the seal strengths were measured in Winch for a benchmark example, i.e., 30DLOR from Norfilm (a blown film based on a blend of LLDPE-C8 and LDPE, melting index of 0.9 g/10 min (measured at 190 C and 2.13 Kg conditions), and a density of 0.923 g/cm³).

Performance of the reference sample, Sample 1, and Sample 3 are illustrated in FIG. 1. Sample 1 and Sample 3 examples show improved seal strength at low temperatures as compared to the reference and benchmarks examples.

In other example embodiments, the disclosed films may be laminated to a blown polyolefin film, such as PE, in order to produce a PE laminate, which confers a recyclability advantage. In other example embodiments, the laminate may be PP, propylene-based polymers, polyethylene-based polymers, mixtures thereof, nylon and combinations thereof.

Based on this disclosure, structures, such as packages, bags, tags, labels, horizontal-form-fill-and-seal ("HFFS") containers, vertical-form-fill-and-seal ("VFFS") containers, lids, sachets, stand-up pouches, overwraps, and so forth (i.e., collectively "applications") may be formed from the disclosed compositions and films, which may be received by a customer. In one particular instance, bags were made on a VFFS packaging machine. In this production, the longitudinal fin seal temperature and the transversal crimp seal temperature were 140° C. In each produced bag, 350 grams of polypropylene resin pellets were packed. Ten bags were dropped from two meters and then evaluated, the results of which are illustrated in Table 6. Samples 1 and 3 showed much better bag-drop resistance under this test than the reference example and were close in performance to the benchmark example.

TABLE 6

Drop Test Results

| Example | Number of Intact Bags after 2 m Drop (out of 10 bags) |
| --- | --- |
| Reference Sample/PET | 0 |
| Sample 1/PET | 9 |
| Sample 3/PET | 9 |
| 30DLOR/PET (benchmark) | 10 |

The seal strengths were also measured under conditions of seal-through contamination. Here, the films were contaminated with coffee powder, milk, or oil, and then the seal strength was measured after sealing on an Otto Bruger sealer having crimp jaws set to exert a pressure 41 N/cm² for a dwell time of 0.75 sec. The results, illustrated in Table 7 showed that samples 1 and 3 maintain high seal strengths even after contamination with a liquid or a powder.

TABLE 7

Seal-Through-Contamination Test Results

| Example | No Contaminant | Coffee Powder | Milk | Oil |
| --- | --- | --- | --- | --- |
| Reference Sample/PET | 0 | 0 | 0 | 0 |
| Sample 1/PET | 9 | 9 | 9 | 9 |
| Sample 3/PET | 9 | 9 | 9 | 9 |
| 30DLOR/PET (benchmark) | 10 | 10 | 10 | 10 |

Core Layer

As is known to those skilled in the art, the core layer of a multilayered film is most commonly the thickest layer and provides the foundation of the multilayered structure. In some embodiments, the core layer consists essentially of linear, low-density polyethylene ("LLDPE") and is substantially free from other components. In alternate embodiments, the core may also contain lesser amounts of additional polymer(s) selected from the group consisting of propylene polymer, ethylene polymer, ethylene-propylene copolymers, ethylene-propylene-butene terpolymers, elastomers, plastomers, and combinations thereof. Although not limiting in any way, examples of suitable LLDPE are those with melting indices of 1 to 4 g/10 min (measured at 190 C and 2.13 Kg conditions), densities from 0.915 or lower to 0.930 g/cm³, and melting peaks within a range from of 90 to 138° C.

The core layer or a tie layer or both may further include a hydrocarbon resin. Hydrocarbon resins may serve to enhance or modify the flexural modulus, improve processability, or improve the barrier properties of the film. The resin may be a low molecular weight hydrocarbon that is compatible with the core polymer. Optionally, the resin may be hydrogenated. The resin may have a number average molecular weight less than 5000, preferably less than 2000, most preferably in the range of from 500 to 1000. The resin can be natural or synthetic and may have a softening point in the range of from 60° C. to 180° C.

Suitable hydrocarbon resins include, but are not limited to petroleum resins, terpene resins, styrene resins, and cyclopentadiene resins. In some embodiments, the hydrocarbon resin is selected from the group consisting of aliphatic hydrocarbon resins, hydrogenated aliphatic hydrocarbon resins, aliphatic/aromatic hydrocarbon resins, hydrogenated aliphatic aromatic hydrocarbon resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, polyterpene resins, terpene-phenol resins, rosins and rosin esters, hydrogenated rosins and rosin esters, and combinations thereof.

Hydrocarbon resins that may be suitable for use as described herein include EMPR 120, 104, 111, 106, 112, 115, EMFR 100 and 100A, ECR-373 and ESCOREZ® 2101, 2203, 2520, 5380, 5600, 5618, 5690 (commercially available from ExxonMobil Chemical Company of Baytown, Tex.); ARKON™ M90, M100, M115 and M135 and SUPER ESTER™ rosin esters (commercially available from Arakawa Chemical Company of Japan); SYLVARES™ phenol modified styrene, methyl styrene resins, styrenated terpene resins, ZONATAC™ terpene-aromatic resins, and terpene phenolic resins (commercially available from Arizona Chemical Company of Jacksonville, Fla.); SYLVATAC™ and SYLVALITE™ rosin esters (commercially available from Arizona Chemical Company of Jacksonville, Fla.); NORSOLENE™ aliphatic aromatic resins (commercially available from Cray Valley of France); DERTOPHENE™ terpene phenolic resins (commercially available from DRT Chemical Company of Landes, France); EASTOTAC™ resins, PICCOTAC™ C5/C9 resins, REGALITE™ and REGALREZ™ aromatic and REGALITE™ cycloaliphatic/ aromatic resins (commercially available from Eastman Chemical Company of Kingsport, Tenn.); WINGTACK™ ET and EXTRA™ (commercially available from Sartomer of Exton, Pa.); FORAL™, PENTALYN™, and PERMALYN™ rosins and rosin esters (commercially available from Hercules, now Eastman Chemical Company of Kingsport, Tenn.); QUINTONE™ acid modified C5 resins, C5/C9 resins, and acid modified C5/C9 resins (commercially available from Nippon Zeon of Japan); and LX™ mixed aromatic/cycloaliphatic resins (commercially available from Neville Chemical Company of Pittsburgh, Pa.); CLEARON™ hydrogenated terpene aromatic resins (commercially available from Yasuhara of Japan); and PICCOLYTE™ (commercially available from Loos & Dilworth, Inc. of Bristol, Pa.). Other suitable hydrocarbon resins may be found in U.S. Pat. No. 5,667,902, incorporated herein by reference. The preceding examples are illustrative only and by no means limiting.

The amount of such hydrocarbon resins, either alone or in combination, in the core layer is preferably less than 20 wt %, more preferably in the range of from 1 wt % to 5 wt %, based on the total weight of the core layer.

The core layer may further comprise one or more additives such as opacifying agents, pigments, colorants, cavitating agents, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt % of the core layer, but some embodiments may comprise additives in the core layer in an amount up to about 30 wt % of the core layer.

The core layer preferably has a thickness in the range of from about 5 µm to 100 µm, more preferably from about 5 µm to 50 µm, most preferably from 5 µm to 25 µm.

Tie Layer(s)

Tie layer(s) of a multilayered film is typically used to connect two other layers of the multilayered film structure, e.g., a core layer and a sealant layer, and is positioned intermediate these other layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers, $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, or combinations thereof. For example, one polymer may be a grade of VISTAMAXX™ polymer (commercially available from ExxonMobil Chemical Company of Baytown, Tex.), such as VM6100 and VM3000 grades. Alternatively, suitable polymers may include VERSIFY™ polymer (commercially available from The Dow Chemical Company of Midland, Mich.), Basell CATALLOY™ resins such as ADFLEX™ T100F, SOFTELL™ Q020F, CLYRELL™ SM1340 (commercially available from Basell Polyolefins of The Netherlands), PB (propylene-butene-1) random copolymers, such as Basell PB 8340 (commercially available from Basell Polyolefins of The Netherlands). Borealis BORSOFT™ SD233CF, (commercially available from *Borealis* of Denmark), EXCEED™ 1012CA and 1018CA metallocene polyethylenes, EXAC™ 5361, 4049, 5371, 8201, 4150, 3132 polyethylene plastomers, EMCC 3022.32 low density polyethylene (LDPE) (commercially available from ExxonMobil Chemical Company of Baytown, Tex.).

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 µm, preferably from about 0.50 µm to 12 µm, more preferably from about 0.50 µm to 6 µm, and most preferably from about 2.5 µm to 5 µm. However, in some thinner films, the tie layer thickness may be from about 0.5 µm to 4 µm, or from about 0.5 µm to 2 µm, or from about 0.5 µm to 1.5 µm.

A skin layer is optional, and, when present, is provided on the outer surface(s) surface of the tie layer(s) or core layer. Skin layer(s) may be provided to improve the film's barrier properties, processability, printability, and/or compatibility for metallization, coating, and lamination to other films or substrates.

In some embodiments, the skin layer comprises at least one polymer selected from the group consisting of a polyethylene polymer or copolymer, a polypropylene polymer or copolymer, an ethylene-propylene copolymer, an ethylene-propylene-butene ("EPB") terpolymer, a propylene-butene copolymer, an ethylene-vinyl alcohol polymer, and combinations thereof. Preferably, the polyethylene polymer is LLDPE such as Exceed™ resin from ExxonMobil Chemicals or Evolue™ resin from Prime Polymer or Elite™ resin from Dow. A suitable ethylene-propylene copolymer is Fina 8573 (commercially available from Fina Oil Company of Dallas, Tex.). A suitable EPB terpolymer is Chisso 7510 and 7794 (commercially available from Chisso Corporation of Japan). For coating and printing functions, the skin layer may preferably be surface-treated. For metallizing or barrier properties, the skin layer may contain LLDPE or ethylene vinyl alcohol based polymer(s) ("EVOH"). Suitable EVOH copolymer is EVAL™ G176B or XEP 1300 (commercially available from Kuraray Company Ltd. of Japan).

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.50 µm to 3.5 µm, preferably from about 0.50 µm to 2 µm, and in many embodiments most preferably from about 0.50 µm to 1.5 µm. Also, in thinner film embodiments, the skin layer thickness may range from about 0.50 µm to 1.0 µm, or 0.50 µm to 0.75 µm.

Coating

In some embodiments, one or more coatings, such as for barrier, printing and/or processing, may be applied to outer surface(s) of the multilayered films. For instance, the coating (s) may be directly on the outer surfaces (i.e., those surfaces facing away from the core) of tie layers, on either or both sides of the core layer, or elsewhere. Such coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings may be applied by an emulsion or solution coating technique or by co-extrusion and/or lamination.

The PVdC coatings that are suitable for use with the multilayered films are any of the known PVdC compositions heretofore employed as coatings in film manufacturing operations, e.g., any of the PVdC materials described in U.S. Pat. Nos. 4,214,039, 4,447,494, 4,961,992, 5,019,447, and 5,057,177, incorporated herein by reference.

Known vinyl alcohol-based coatings, such as PVOH and EVOH, that are suitable for use with the multilayered films include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying the coating composition to the appropriate substrate, the outer surface(s) of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, flame treatment and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto.

The coating composition can be applied to the film as a water-based solution. The coating composition may be applied to the treated surface in any convenient manner, such as by gravure coating, roll coating, dipping, spraying, and the like. The excess aqueous solution can be removed by squeeze rolls, doctor knives, and the like.

Additives

Additives that may be present in one or more layers of the multilayered films, include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives may be used in effective amounts, which vary depending upon the property required. Additives such as oxygen scavenger or gas scavenger can be added in any layer.

Examples of suitable opacifying agents, pigments or colorants are iron oxide, carbon black, aluminum, titanium dioxide ($TiO_2$), calcium carbonate ($CaCO_3$), polybutylene terephthalate (PBT), talc, beta nucleating agents, and combinations thereof.

Cavitating or void-initiating additives may include any suitable organic or inorganic material that is incompatible with the polymer material(s) of the layer(s) to which it is added, at the temperature of biaxial orientation, in order to create an opaque film. Examples of suitable void-initiating particles are PBT, nylon, solid or hollow pre-formed glass spheres, metal beads or spheres, ceramic spheres, calcium carbonate, talc, chalk, or combinations thereof. The average diameter of the void-initiating particles typically may be from about 0.1 to 10 μm.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. Examples of useful slip additives include high-molecular-weight polydimethylsiloxane ("PDMS"), silicone oil, or silicone gum.

Non-migratory slip agents, used in one or more skin layers of the multilayered films, may include polymethyl (methacrylate) (PMMA). The non-migratory slip agent may have a mean particle size in the range of from about 0.5 μm to 8 μm, or 1 μm to 5 μm, or 2 μm to 4 μm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkylsiloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be coated with a wax-containing coating, for lubricity, in amounts ranging from 2 wt % to 15 wt % based on the total weight of the skin layer. Any conventional wax, such as, but not limited to Carnauba™ wax (commercially available from Michelman Corporation of Cincinnati, Ohio) that is useful in thermoplastic films is contemplated.

Orientation

The embodiments include possible uniaxial or biaxial orientation of the multilayered films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times the extruded width in the machine direction and between about four to about ten times the extruded width in the transverse direction. Typical commercial orientation processes are BOPP tenter process, blown film, and LISIM technology.

Surface Treatment

One or both of the outer surfaces of the multilayered films, and, in particular, the sealant layers, may be surface-treated to increase the surface energy to render the film receptive to metallization, coatings, printing inks, and/or lamination. The surface treatment can be carried out according to one of the methods known in the art including corona discharge, flame, plasma, chemical treatment, or treatment by means of a polarized flame.

Metallization

Outer surface(s) (i.e., the side facing away from the core) of the multilayered films may be metallized and optionally coated thereafter. For example, outer surfaces of the sealant layers and/or skin layers may undergo metallization after optionally being treated. Metallization may be carried out through conventional methods, such as vacuum metallization by deposition of a metal layer such as aluminum, copper, gold, silver, zinc, chromium, or mixtures thereof, or any other metallization technique, such as electroplating or sputtering. Typically, a metal layer is applied to an optical density (OD) of from 1.5 to 5.0 or preferably from 1.8 to 4.0, in accordance with the standard procedure of ANSI/NAPM IT2.19.

In certain embodiments, the metal is metal oxide, any other inorganic materials, or organically modified inorganic materials, which are capable of being vacuum deposited, electroplated or sputtered, such as, for example, $SiO_x$, $AlO_x$, $SnO_x$, $ZnO_x$, $IrO_x$, organically modified ceramics "ormocer", etc. Here an integer x is 1 or 2. The thickness of the deposited layer is typically in the range from 100 to 5,000 Å or preferably from 300 to 3000 Å.

Priming

A primer coating may be applied to any surface of the multilayered films. In this case, the film may be first treated by one of the foregoing methods to provide increased active adhesive sites thereon and to the thus-treated film surface there may be subsequently applied a continuous coating of a primer material. Such primer materials are well known in the art and include, for example, epoxy and poly(ethylene imine) (PEI) materials. U.S. Pat. Nos. 3,753,769, 4,058,645 and 4,439,493, each incorporated herein by reference, disclose the use and application of such primers. The primer provides an overall adhesively active surface for thorough and secure bonding with the subsequently applied coating composition and can be applied to the film by conventional solution coating means, for example, by roller application.

The films herein are also characterized in certain embodiments as being biaxially oriented. The films may be made by any suitable technique known in the art, such as a tenter process, double bubble process, LISIM™, or others. Further, the working conditions, temperature settings, lines speeds, etc. will vary depending on the type and the size of the equipment used. Nonetheless, described generally here is one method of making the films described throughout this disclosure. In one particular embodiment, the films are formed and biaxially oriented using the "tentered" method. In the tenter process, sheets/films of the various materials are melt-blended and coextruded, such as through a 3, 4, 5, 7-layer die head, into the desired film structure. Extruders may be used to melt-blend the molten layer materials, the melt streams then metered to the die. The extruded sheet is then cooled using air, water, or both.

Downstream of the first cooling step in this example embodiment of the tentered process, the unoriented sheet is re-heated to a temperature of from 60 to 100 or 120 or 150° C. by any suitable means, such as heated S-wrap rolls, and then passed between closely spaced differential speed rolls to achieve machine-direction orientation. It is understood by those skilled in the art that this temperature range may vary depending upon the equipment, and, in particular, upon the identity and composition of the components constituting the film. Ideally, the temperature will be below that which will melt the film, or cause it to become tacky and adhere to the equipment, but high enough to facilitate the machine-direction orientation process. Notably, such temperatures referred to herein refer to the film temperature, itself. The film temperature may be measured by using, for example, infrared spectroscopy, the source being aimed at the film as it is being processed; those skilled in the art will understand that measuring the actual film temperature may not be precise and/or fully accurate. In this case, those skilled in the art may estimate the temperature of the film by knowing the temperature of the air or roller immediately adjacent to the film that is measured by any suitable means. The heating means for the film line may be set at any appropriate level of heating, depending upon the instrument, to achieve the stated or desired film temperatures.

Subsequently, the lengthened and thinned film is cooled and passed to the tenter section of the line for TD orientation. At this point, the edges of the sheet are grasped by mechanical clips on continuous chains and pulled into a long, precisely controlled, hot-air oven for a pre-heating step. The film temperatures may range from 80 or 110 to 150 or 160° C. in the pre-heating step. Again, the temperature is ideally below that which will melt the film, but high enough to facilitate the step of transverse-direction orientation. Next, the edges of the sheet are grasped by mechanical clips on continuous chains and pulled into a long, precisely controlled, hot-air oven for transverse stretching. The tenter chains diverge a desired amount to stretch the film in the transverse direction at a temperature high enough to facilitate the step of transverse-direction orientation but low enough so as not to melt the film. After stretching to the required transverse orientation, the film is then cooled from 5 to 10 or 15 or 20 or 30 or 40° C. below the stretching temperature, and the mechanical clips are released prior to any edge trimming. Thereafter, optional corona or any other treatment may take place followed by winding.

Thus, in certain embodiments the film(s) described herein are biaxially oriented with at least a 5 or 6 or 7 or 8-fold TD orientation and at least a 2 or 3 or 4-fold MD orientation.

In various embodiments, cavitation and/or opacity-inducing agents are substantially absent, meaning that they are not present in the core in any detectable amount. Examples of cavitation and/or opacity-inducing agents includes calcium carbonate, talc, carbon black, clay, untreated silica and alumina, zinc oxide, mica, asbestos, barites, magnesium carbonate and mixtures thereof, as well as those materials made from polybutylene terephthalate, nylon-6, cyclic olefin copolymers particles, and other particles that are phase-distinct from the core layer material, and having a size that, during orientation, will create cavities in the core layer.

INDUSTRIAL APPLICABILITY

The disclosed multilayered films may be are as stand-alone films, laminates, or webs. Or, the multilayered films may be sealed, coated, metallized, and/or laminated to other film structures, such as discussed herein. The disclosed multilayered films may be prepared by any suitable methods comprising the steps of co-extruding a multilayered film according to the description and claims of this specification, orienting and preparing the film for intended use such as by coating, printing, slitting, or other converting methods.

For some applications and as previously discussed, it may be desirable to laminate the multilayered films to other polymeric film or paper products for purposes such as package decor including printing and metallizing. These activities are typically performed by the ultimate end-users or film converters who process films for supply to the ultimate end-users.

The prepared multilayered film may be used as a flexible packaging film to package an article or good, such as a food item or other product. In some applications, the film may be formed into a pouch type of package, such as may be useful for packaging a beverage, liquid, granular, or dry-powder product.

In view of the foregoing, various bags, packages, pouches (e.g., stand-up, vertical fill-and-seal, horizontal fill-and-seal, etc.), films, laminates, and other structures may be formed from the above-described films, wherein such may have products (e.g., food, beverages) of any phase that require seals having requisite integrity and/or barriers to water and/or oxygen transmission with low thickness.

While the foregoing is directed to example embodiments of the disclosed invention, other and further embodiments may be devised without departing from the basic scope thereof, wherein the scope of the disclosed apparatuses, systems and methods are determined by one or more claims.

What is claimed is:

1. A biaxially oriented, multilayer film comprising:
   a core layer consisting of one or more linear, low-density polyethylene(s), a slip agent, and, optionally, pigment;
   a surface skin layer consisting of one or more linear, low-density polyethylene(s), an antiblock agent, and, optionally, a pigmenting agent;
   a sealant skin layer consisting of linear, low-density polyethylene(s), an anti-block agent, wherein concentration of the antiblock agent in the sealant skin layer is higher than in the surface skin layer, optionally, a pigmenting agent, and, optionally, a slip agent;
   a first tie layer between the surface skin layer and the core layer, wherein the first tie layer consists of one or more linear, low-density polyethylene(s) optionally in combination with pigmenting additive, wherein the pigmenting additive is optionally in a masterbatch solution, and, optionally, a slip agent; and
   a second tie layer between the sealant skin layer and the core layer, wherein the second tie layer consists of linear, low-density polyethylene(s) optionally in combination with: (i) a pigmenting additive, wherein the pigmenting additive is optionally in a masterbatch solution; and/or (ii) a slip agent,
   wherein the one or more linear, low-density polyethylene(s) have lower melt indices and greater densities than the linear, low-density polyethylene(s),
   wherein the biaxially oriented, multilayer film has a seal strength of at least 4000 g/in from 90° C. through 150° C. against a polyethylene laminate with jaws set to exert a pressure of 41 N/cm$^2$ for a dwell time of 0.75 sec.

2. The biaxially oriented, multilayer film of claim 1, wherein the biaxially oriented, multilayer film has a total thickness between 10 μm and 120 μm.

3. The biaxially oriented, multilayer film of claim 1, wherein the surface skin layer and/or the sealant skin layer is subjected to corona discharge treatment, flame treatment, polarized flame treatment, plasma treatment, chemical treatment, or combinations thereof.

4. The biaxially oriented, multilayer film of claim 1, wherein the one or more linear, low-density polyethylene(s) in the core layer, the first tie layer and the surface skin layer, and the linear, low-density polyethylene(s) in the second tie layer and the sealant skin layer are metallocene-catalyzed, Ziegler-Natta-catalyzed, otherwise catalyzed, or combinations thereof.

5. The biaxially oriented, multilayer film of claim 1, wherein at least one of the surface skin layer or the sealant skin layer is coated with a polymer comprising ethylene acrylic acid, ethylene methyl acrylate copolymer, polyvinylidene chloride, polyvinyl alcohol, ethyl vinyl alcohol, or combinations thereof.

6. The biaxially oriented, multilayer film of claim 1, wherein at least one of the surface skin layer or the sealant skin layer is metallized.

7. The biaxially oriented, multilayer film of claim 1, wherein the slip agent in the sealant skin layer is non-migratory.

8. The biaxially oriented, multilayer film of claim 1, wherein the biaxially oriented, multilayer film is adhered to a polyester substrate using a solvent-based adhesive.

9. The biaxially oriented, multilayer film of claim 1, wherein the biaxially oriented, multilayer film is laminated to a polyolefin film comprising polyethylene, polypropylene, nylon, or combinations thereof.

10. The biaxially oriented, multilayer film of claim 1, wherein the biaxially oriented, multilayer film forms a package, bag, tag, label, horizontal form-fill-and-seal container, vertical form-fill-and-seal container, lid, sachet, pouch, overwrap, or combinations thereof.

11. The biaxially oriented, multilayer film of claim 1, wherein the sealant skin layer possess the slip agent.

12. The biaxially oriented, multilayer film of claim 1, wherein the slip agent is present in the first tie layer.

13. The biaxially oriented, multilayer film of claim 1, wherein the slip agent is present in the second tie layer.

14. The biaxially oriented, multilayer film of claim 1, wherein the slip agent in the second tie layer is non-migratory.

15. The biaxially oriented, multilayer film of claim 1, wherein the slip agent is present in the first tie layer and the second tie layer.

16. The biaxially oriented, multilayer film of claim 1, wherein the slip agent in the core layer is migratory.

17. The biaxially oriented, multilayer film of claim 1, further comprising a laminated film on the sealant skin layer.

18. The biaxially oriented, multilayer film of claim 1, wherein the sealant skin layer is laminated to a polyester film.

19. A biaxially oriented, multilayer film comprising:
   a core layer consisting of one or more linear, low-density polyethylene(s), a slip agent, and, optionally, pigment;
   a surface skin layer consisting of one or more linear, low-density polyethylene(s), an antiblock agent, and, optionally, a pigmenting agent;
   a sealant skin layer consisting of linear, low-density polyethylene(s), and an anti-block agent;
   a first tie layer between the surface skin layer and the core layer, wherein the first tie layer consists of one or more linear, low-density polyethylene(s) optionally in combination with pigmenting additive, wherein the pigmenting additive is optionally in a masterbatch solution, and, optionally, a slip agent; and a second tie layer between the sealant skin layer and the core layer, wherein the second tie layer consists of linear, low-density polyethylene(s) optionally in combination with: (i) a pigmenting additive, wherein the pigmenting additive is optionally in a masterbatch solution; and/or (ii) a slip agent, wherein the one or more linear, low-density polyethylene(s) have lower melt indices and greater densities than the linear, low-density polyethylene(s), wherein the biaxially oriented, multilayer film has a seal strength of at least 4000 g/in from 90° C. through 150° C. against a polyethylene laminate with jaws set to exert a pressure of 41 N/cm$^2$ for a dwell time of 0.75 sec.

* * * * *